(12) United States Patent
Aleksic et al.

(10) Patent No.: US 7,057,620 B2
(45) Date of Patent: Jun. 6, 2006

(54) METHOD AND APPARATUS FOR GRAPHICS RENDERING ON A MOBILE DEVICE

(75) Inventors: Milivoje Aleksic, Richmond Hill (CA); Adrian Hartog, Toronto (CA)

(73) Assignee: ATI Technologies Inc., Markham (CA)

( * ) Notice: Subject to any disclaimer, the term of this patent is extended or adjusted under 35 U.S.C. 154(b) by 108 days.

(21) Appl. No.: 10/647,772

(22) Filed: Aug. 25, 2003

(65) Prior Publication Data
US 2005/0046633 A1 Mar. 3, 2005

(51) Int. Cl.
G06T 1/00 (2006.01)
G06F 15/00 (2006.01)

(52) U.S. Cl. ...................... 345/522; 345/503
(58) Field of Classification Search ............. 345/503, 345/519, 520, 522, 531, 533, 537, 552
See application file for complete search history.

(56) References Cited

U.S. PATENT DOCUMENTS

| | | | |
|---|---|---|---|
| 6,201,547 B1 * | 3/2001 | Rogers et al. | 345/582 |
| 6,342,892 B1 * | 1/2002 | Van Hook et al. | 345/503 |
| 6,609,977 B1 * | 8/2003 | Shimizu et al. | 463/36 |
| 6,636,225 B1 * | 10/2003 | Alcorn et al. | 345/552 |
| 6,677,967 B1 * | 1/2004 | Sawano et al. | 715/839 |
| 6,762,763 B1 * | 7/2004 | Migdal et al. | 345/506 |
| 6,844,895 B1 * | 1/2005 | Billerbeck et al. | 348/211.2 |
| 2004/0117785 A1 * | 6/2004 | Kincaid | 717/170 |
| 2004/0223614 A1 * | 11/2004 | Seaman | 380/239 |
| 2005/0014395 A1 * | 1/2005 | Fjelstad et al. | 439/61 |

* cited by examiner

*Primary Examiner*—Kee M. Tung
(74) *Attorney, Agent, or Firm*—Vedder, Price, Kaufman & Kammholz, P.C.

(57) ABSTRACT

A method and apparatus for graphics rendered in a mobile device includes a command queue capable of receiving a plurality of rendering commands, a generate_event command and a wait_until command. The wait_until command corresponds to the completion of a specific operation indicated by the generate_event command. The method and apparatus further includes a direct memory access device operably coupled to the command queue, wherein the DMA device is capable of receiving a memory access command in response to the generate_event command. A memory device is capable of storing rendering information, wherein the memory device is accessible in response to the generate_event command. Furthermore, the method and apparatus includes the command queue capable of queuing the rendering commands in response to the wait_until command until the completion of the operation indicated by the generate_event command.

29 Claims, 5 Drawing Sheets

METHOD AND APPARATUS FOR GRAPHICS RENDERING ON A MOBILE DEVICE

FIELD OF THE INVENTION

The present invention relates generally to mobile devices and more particularly to graphics rendering within the mobile device.

BACKGROUND OF THE INVENTION

With the growth of modem computing trends, there is an increased demand in portability and improved functionality of a mobile device, wherein a mobile device may be, but not limited to, a cellular phone, a personal digital assistant (PDA), a pager, a smart phone, or any other suitable portable electronic device capable of providing graphical interactivity, as recognized by one having ordinary skill in the art. Furthermore, with the convergence of mobile devices having improved functionality and stand alone computing systems, such as a desktop or laptop computer, having greater interactivity with the mobile device, there is a greater demand for improved functionality and quality of interactivity between multiple mobile devices and also interactivity between the mobile device and the stand alone computing system.

An emerging area in mobile devices is the ability to acquire, render and transmit graphical and/or video images. One example of convergence of multiple technologies is the placement of cameras on mobile devices. Another example is the development of interactive video games to be played on the mobile device. With these graphic intensive applications, there exist prior art limitations with regard to graphical architecture for generating the graphical output. One common problem in the mobile device is the limited power and memory resources. Current graphics rendering techniques, including three-dimensional graphics rendering techniques, require an extensive amount of power to perform the various and multiple steps in a graphics-processing pipeline. Furthermore, three-dimensional graphics rendering may also be memory intensive due to memory requirements for storing, among other things, vertex information, pixel information, and/or texture data. In modern mobile devices, due to size requirements and power requirements, there is an extremely limited amount of available space for providing memory resources and power consumption constraints severely restrict graphics rendering while maintaining an extended mobile device battery life.

Another specific limitation found within current mobile devices is limited physical real-estate for placing graphics rendering engines and also limited bandwidth availability for processing the graphics rendering data. As mobile devices become more compact, there exists less real-estate for the insertion of additional processors for performing the graphics processing operations, such as two-dimensional or three-dimensional rendering. Furthermore, the available bandwidth for transmitting the graphics rendering data is also limited. Among other things, size constraints prohibit a large data bus for graphics rendering information and therefore can severely restrict the processing speed and/or quality of a graphics rendering engine.

Therefore, a need exists for a method and apparatus that overcomes power consumption requirements, limited memory resources, limited bandwidth availability within the mobile device and provides for graphics rendering effectively using the limited available real-estate within the mobile device.

DETAILED DESCRIPTION OF A PREFERRED EMBODIMENT

Generally, the present invention provides a method and apparatus for graphics rendering in a mobile device including a command queue capable of receiving a plurality of rendering commands, a generate_event command and a wait_until command. The command queue may be any type of queue as recognized by one having ordinary skill in the art, such as a first-in-first-out (FIFO) buffer, a ring buffer, or any other suitable buffer. The rendering commands include any type of executable commands which are provided for the performance of a rendering execution, as recognized by one having ordinary skill in the graphics rendering art. The generate_event command may be any type of executable command which indicates an action to be performed by a processing device and the wait_until command may be a hold command which provides for stalling processing events until an operation is complete, wherein the wait_until command corresponds to the completion of an operation indicated by the generate_event command.

The method and apparatus further includes a direct memory access (DMA) device coupled to the command queue. The DMA device may be any direct memory access device as recognized by one having ordinary skill in the art. In one embodiment, the DMA device is capable of receiving a memory access command in response to the generate_event, wherein the memory access command is an executable command to access a specific memory location. Moreover, the method and apparatus includes a memory device storing rendering information, wherein the memory device is accessible in response to the generate_event command. The memory device may be, but not limited to, a single memory, plurality of memory locations, shared memory, CD, DVD, ROM, RAM, EEPROM, optical storage, or any other non-volatile storage medium capable of storing digital data.

In one embodiment, the command queue is capable of queuing the rendering command in response to the wait_until command until the completion of the operation indicated by the generate_event command. Therefore, through the utilization of the DMA device and the command queue, in response to the rendering commands, generate_event command and wait_until command, an improved method and apparatus for graphics rendering in a mobile device includes power reduction by more efficiently utilizing and executing specific commands and reduces memory constraints through the efficient utilization of the memory device, as further described below.

Figure 1:
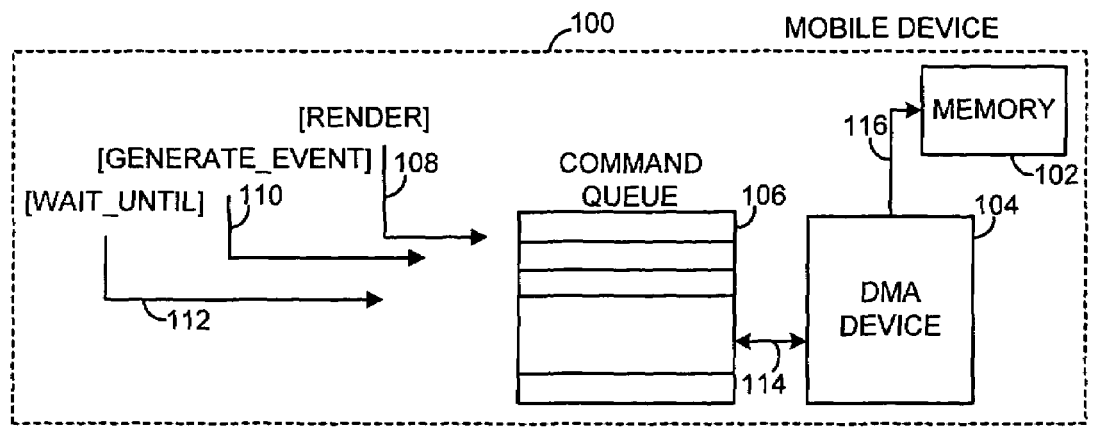
FIG. 1 illustrates a schematic block diagram of an apparatus for graphics rendering in a mobile device in accordance with one embodiment of the present invention.

More specifically, FIG. 1 illustrates an apparatus for graphics rendering in accordance with one embodiment of the present invention. A mobile device 100 includes a memory 102 coupled to a DMA device 104. As described above, the memory 102 may be, but not limited to, a single memory, plurality of memory locations, shared memory, CD, DVD, ROM, RAM, EEPROM, optical storage, or any other non-volatile storage medium capable of storing digital data.

The DMA device 104 is coupled to a command queue 106 wherein the command queue receives render commands 108, generate_event commands 110 and wait_until commands 112.

A generate_event command 110 may be provided from the command queue 106 to the DMA device 104, via operable connection 114, which may be any suitable type of coupling device such as, but not limited to, a uni-directional bus or a bidirectional bus. In one embodiment, the generate_event command may be a command to access a specific memory location, therefore the DMA device 104 receives a memory access command to access the memory 102. The memory device 102 is capable of storing rendering information therein, wherein the memory 102 is coupled to the DMA device 104 across any suitable operably coupling means 116, such as, but not limited to, a uni-directional bus or a bidirectional bus. In another embodiment, as discussed below, the DMA device 104 may be coupled to the memory 102 across a memory interface, not shown.

The command queue 106 within the mobile device 100 is capable of queuing the rendering commands 108 in response to the wait_until command 112, until the completion of an operation, such as a memory access command, indicated by the generate_event command 110. Thereupon, the command queue 106 provides for efficient utilization of the memory 102, with regard to the DMA device 104 through queuing commands such as 108, 110 and 112, in the command queue 106.

Figure 2:
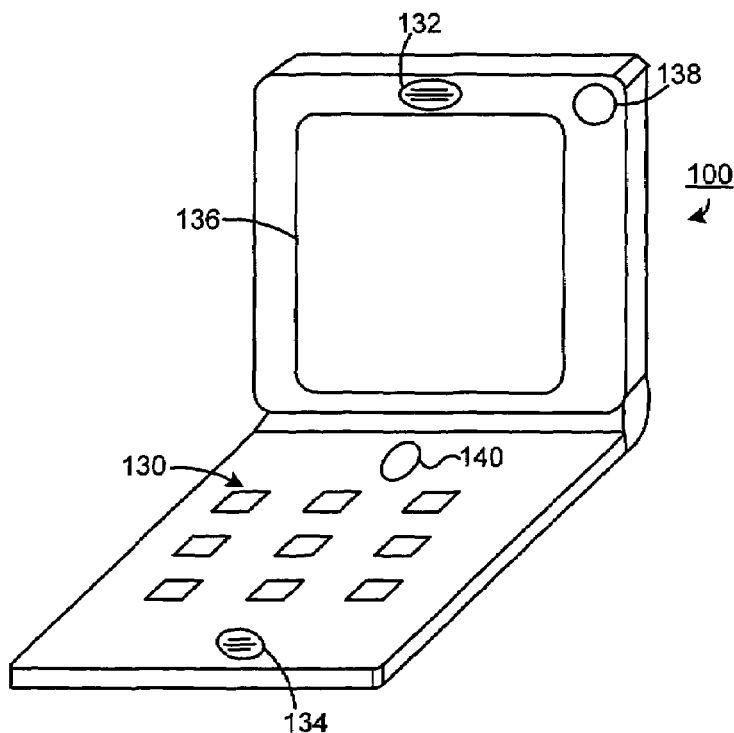
FIG. 2 illustrates a graphical representation of one embodiment of a mobile device.

FIG. 2 illustrates one embodiment of a mobile device 100, in accordance with one embodiment of the present invention. The mobile device 100 includes a keypad 130, a speaker 132, a microphone 134, a display 136, a camera 138 and a navigational button 140. As recognized by one having ordinary skill in the art, the mobile device 100 is for exemplary purposes only and the present invention may include any other suitable mobile device having a display 136, and in one embodiment a camera 138, with the elements illustrated in FIG. 1. In the mobile device 100 of FIG. 2, the camera 138 may provide for video acquisition. Moreover, the mobile device 100 may further contain a processor, not shown, that in response to executable instructions, operates a video game requiring three-dimensional graphics, thereupon utilizing the method and apparatus for graphics rendering.

Figure 3:
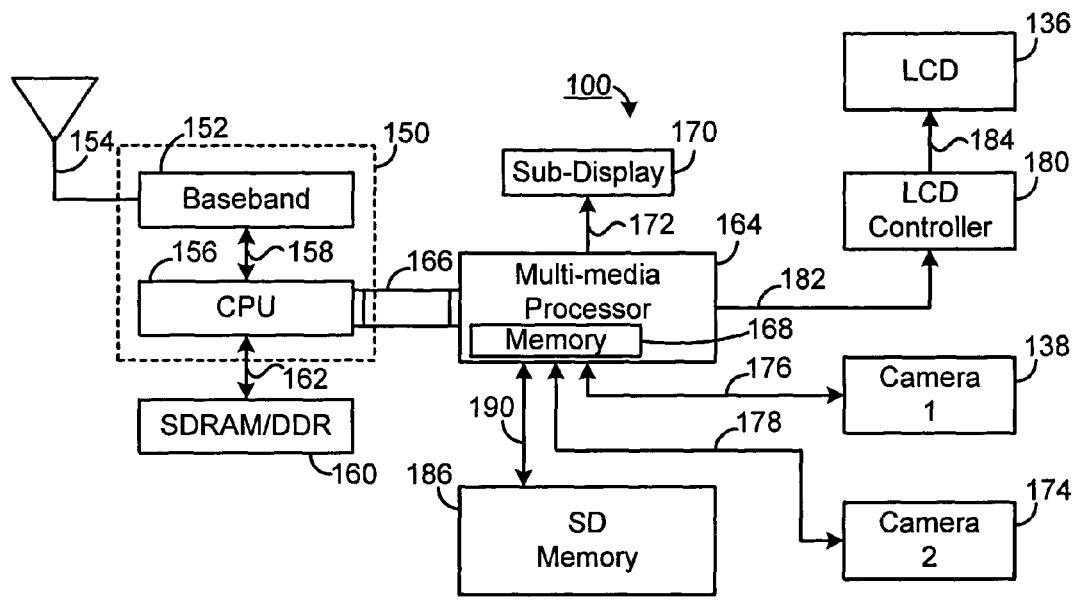
FIG. 3 illustrates a schematic block diagram of an apparatus for graphics rendering in accordance with another embodiment of the present invention.

FIG. 3 illustrates a block diagram of an apparatus for graphics rendering within the mobile device 100. The mobile device 100 includes a main processing system 150 including a baseband receiver 152 coupled to an antenna 154 for wireless communication therethrough. The baseband receiver 152 may be operably coupled to a central processing unit (CPU) 156 for communicating communication information 158 therethrough. As recognized by one having ordinary skill in the art, the main processing unit 150 may be in accordance with known processing units currently implemented and utilized within existing mobile devices.

In one embodiment, the CPU 156 may be coupled to an SDRAM/DDR 160 such that processing information 162 may be stored thereon and transferred between the memory 160 and the CPU 156. The CPU 156 is further coupled to a multi-media processor 164 across a flex cable 166. The multi-media processor 164 further includes a memory 168 disposed therein.

In one embodiment, the multi-media processor 164 is operably coupled to a sub-display 170 for providing limited visual output 172 thereto. An example of sub-display 170 may be a small liquid crystal display (LCD) disposed on the exterior of a clam-shell mobile device, wherein a reduced display, such as a caller ID may be displayed. The sub-display 170 generates a limited graphical output, therefore limited graphical processing resources are required to generate the sub-display output 172.

The multi-media processor 164 is further operably coupled to the first camera 138 and, in one embodiment, a second camera 174. The first camera 138 is capable of providing a first acquired image 176 to the multi-media processor 164 and the second camera 174 is capable of providing a second acquired image 178 to the multi-media processor 164.

The multi-media processor 164 is also further operably coupled to the display 136 through a display controller 180. FIG. 3 illustrates the display 136 in an exemplary embodiment of a liquid crystal display (LCD), but as recognized by one having ordinary skill in the art, any other suitable output display device may be utilized. The multi-media processor 164, upon completing processing of graphics data, provides a video display output 182 to the LCD controller 180 which thereupon generates a display signal 184 provided to the display 136. As recognized by one having ordinary skill in the art, the multi-media processor 164 may provide the video display output 182 directly to the display 136.

Further within the embodiment of FIG. 3, the multi-media processor 164 may be coupled to an external memory 186, such as secured digital (SD) memory. In one embodiment, the SD memory 186 may be a SanDisk 256 MB secured digital card, SD SDSDB-256-781 available from Sand Disk, 140 Caspian Court, Sunnyvale, Calif. 94089.

The multi-media processor 164 may be similar to the generally described FIG. 1, including the command queue 106, the DMA device 104 and the memory 102. In one embodiment, the embedded memory 168 may be the memory 102 or the memory 102 may be a combination of the embedded memory 168 and the SD memory 186. Moreover, FIG. 3 illustrates the multi-media processor 164 coupled to the SD memory 186 across memory interface 190.

In one embodiment of the present invention, the CPU 156 may be operably coupled to the LCD 136, wherein the LCD 136 includes the LCD controller 180 therein, being operably coupled across the flex cable 166. The multi-media processor 164 may provide for specifically receiving the rendering commands, generate_event command and the wait_until command in an internal processor, as discussed below.

Therefore, in one embodiment, when a capture video image 176 or 178 is acquired with a camera, 138 or 174 respectively, the multi-media processor 164 performs graphics processing to render the video display. Through using the command queue 106 of FIG. 1 and the DMA device 104, in response to rendering commands, generate_event commands and wait_until commands, efficient utilization of the memory 102, including, but not limited to, the embedded memory 168 and/or the external memory 186, the video display output 182 may be generated and provided to the display 136. In prior graphics processing techniques, the CPU 156 may perform the graphics rendering, which would further require the SDRAM/DDR memory 160 to further include memory for storing graphics data and rendering information, such as, but not limited to, texture data, vertex data, or scene description data. Therefore, by utilizing a separate multi-media processor 164, CPU 156 executions are reduced thereby improving CPU processing speed and memory resources, whether it be the embedded memory 168 or external memory 186, are more efficiently utilized for the memory intensive graphics rendering process.

Figure 4:
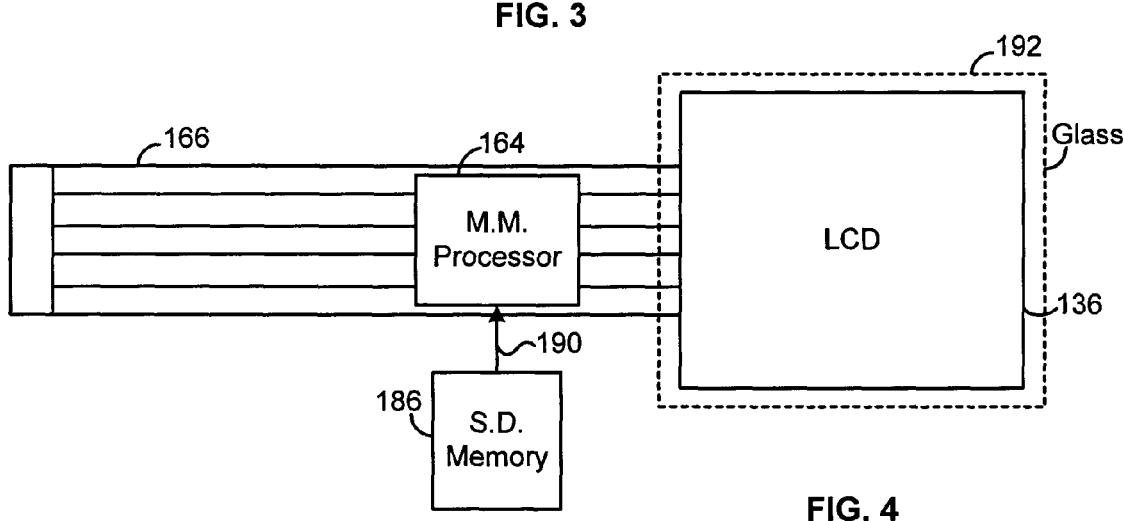
FIG. 4 illustrates a graphical representation of a portion of a mobile device having the ability for graphics rendering in accordance with one embodiment of the present invention.

FIG. 4 illustrates one embodiment of the placement of the multi-media processor 164 relative to the flex assembly 166 in the embodiment where the flex assembly 166 is operably coupled to the LCD 136. Using known flex mounting techniques, the multi-media processor 164 may be mounted directly on the flex 166, thereby efficiently utilizing the amount of available real-estate within the typical mobile device 100. The multi-media processor 164 is still further coupleable to the SD memory 186, in this embodiment illustrated as an SD card across the external memory interface 190. Similar to the display 136 of FIG. 2, the display 136 may include glass 192 disposed over the display to protect the display device 136.

In an alternative embodiment, to conserve further valuable real-estate resources within the mobile device 100, the multi-media processor 164 may be mounted directed to the glass 192 in an area outside of the display 136 such that the multi-media processor 164 may still be operably coupled to the SD card 186. As recognized by one having ordinary skill in the art, many elements have been omitted within FIGS. 3 and 4, for clarity purposes only.

Figure 5:
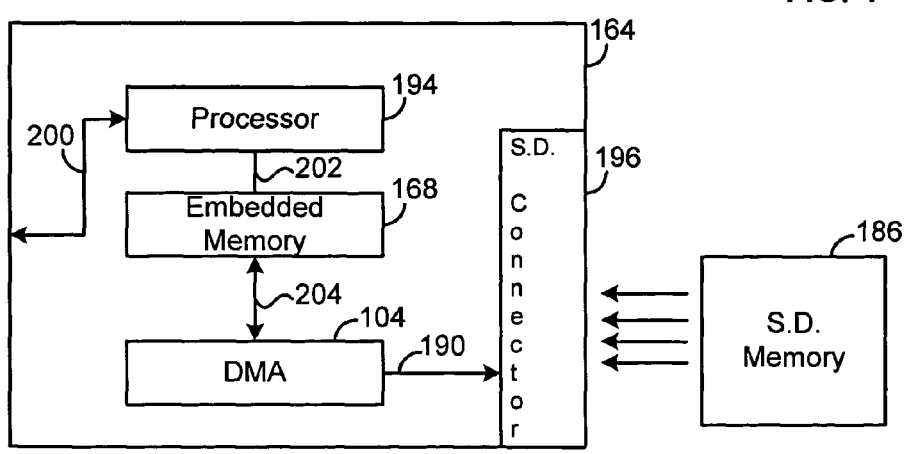
FIG. 5 illustrates a graphical representation of a multimedia processor and a memory device, in accordance with one embodiment of the present invention.

FIG. 5 illustrates a further graphical representation of the multi-media processor 164 having the embedded memory 168, a processor 194 and the DMA device 104 therein. The processor 194 may be, but not limited to, a single processor, a plurality of processors, a DSP, a microprocessor, ASIC, state machine, or any other implementation capable of processing and executing software or discrete logic or any suitable combination of hardware, software and/or firmware. The processor should not be construed to refer exclusively to hardware capable of executing software, and may implicitly include DSP hardware, ROM for storing software, RAM, and any other volatile or non-volatile storage medium.

The processor 194 receives commands 200, which may be received from the CPU 156, not illustrated, or the commands 200 may be received from an external video acquisition device, such as the camera 138 or 174, not illustrated. Regardless thereof, the processor 194, generates commands 202, such as render commands 108, generate_event commands 110 and/or wait_until commands 112, as illustrated in FIG. 1. The embedded memory 168 may include the command queue 106, not specifically illustrated, as shown in FIG. 1 to receive the commands 202. From the embedded memory 168, specific memory access commands 204 provided to the DMA device 104 which may thereupon retrieve rendering information from the SD memory 186 across an SD connector 196 having the SD memory 186 inserted therein, wherein the information is transmitted across the external memory interface 190. As recognized by one having ordinary skill in the art, many elements have been omitted within the multi-media processor 164 for clarity purposes only.

Although, as illustrated, the multi-media processor 164 allows for the reception of execution commands 200 to be performed by the processor 194 and the utilization of embedded memory 168 and the DMA device 104 for efficiently retrieving and utilizing memory 186 for the rendering of graphics data. It is further noted that the multi-media processor 164 may be a graphics rendering chip for disposition within a mobile device, wherein the graphics rendering chip may be a silicon-based wafer embedded within a carrier having a plurality of substrates for execution thereon. Furthermore, the graphics processing chip may be any other suitable type of processing element recognized by one having ordinary skill in the art.

Figure 6:
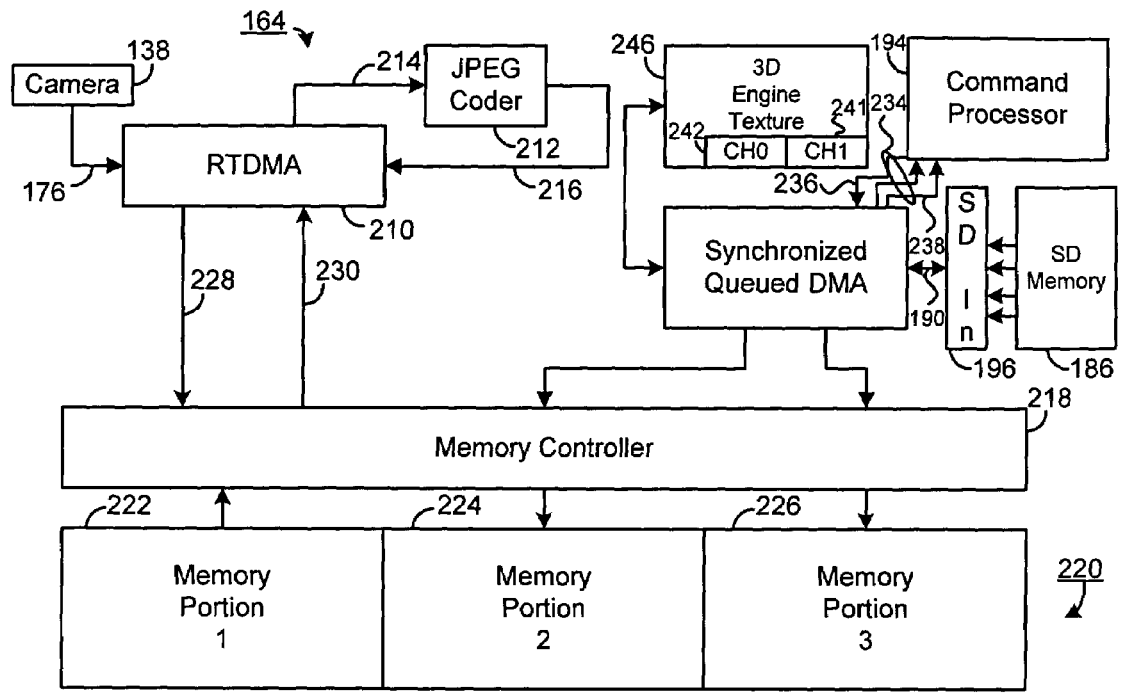
FIG. 6 illustrates another embodiment of an apparatus and graphics rendering.

FIG. 6 illustrates an alternative embodiment of a specific implementation of the multi-media processing device 164 which may be disposed within a mobile device, not shown, for executing graphics rendering for either static graphics displays or a continuous graphical display, such as a movie or videogame. The multi-media processor 164 includes a real-time direct memory access (RTDMA) device 210 capable of capturing a video image 176 from the camera 138. The RTDMA device 210 is operably coupled to a JPEG coder 212 such that the RTDMA 210 provides an encoded image 214 to the JPEG coder 212 and receives a decoded image 216 therefrom.

The RTDMA 210 is further coupled to a memory controller 218 which is coupled to a memory 220 having a first memory portion 222, a second memory portion 224 and a third memory portion 226. The memory controller 218 receives a memory access request 228 from the RTDMA 210 and provides, in one embodiment, graphics information 230 thereto.

The memory controller 218 is further operably coupled to a synchronized queued direct memory access device 232. The synchronized queued direct memory access device 232, similar to the DMA device 104, is coupled to a secured digital memory device interface connector 196 capable of receiving an external memory 186, such as a secure digital memory card across an external memory interface 190. The synchronized queued DMA 232 is further coupled to the command processor 194 across a bus 234. The command processor 194 provides an event command 236 to the synchronized queued DMA 232 and the synchronized queued DMA provides a done command 238 back to the command processor.

Further coupled to the synchronized queued DMA 232 is a three-dimensional texture engine 240 having a first texture cache 242 and a second texture cache 244. The three-dimensional texture engine 240 may perform texturing operations using texture information stored within the first texture cache 242 or the second texture cache 244. In one embodiment, the texture information may be provided to the texture caches 242 and 244 across the interface 190 through the synchronized queued DMA 232 which provides for a low bandwidth texture data transmission. Since the texture information may be readily stored on the SD memory 186, a reduction in processing requirements and a limited bandwidth requirement may be utilized to provide the texture information to the three-dimensional texture engine 240 across a bus 248.

Referring back to the JPEG coder, in one embodiment, the memory portion 222, 224 and 226 may be 64K memory portions wherein a JPEG image may be stored within the second memory portion and texture information for the JPEG image may also be stored within that memory portion. Through the memory portion 218, the compressed texture information may be provided through the RTDMA 210 to be decompressed by the JPEG coder 212 and written back into memory portion 222. In one embodiment, the decoded JPEG information and texture information may be provided for memory portion 222 to memory portion 224 such that it may be provided to the memory controller 218.

Furthermore, in one embodiment, the third memory portion may further include the command queue stored therein such that the synchronized queued DMA may receive the render commands, generate_event commands and wait_until commands through the command queue within the third memory portion 226 across the memory controller 218.

Figure 7:
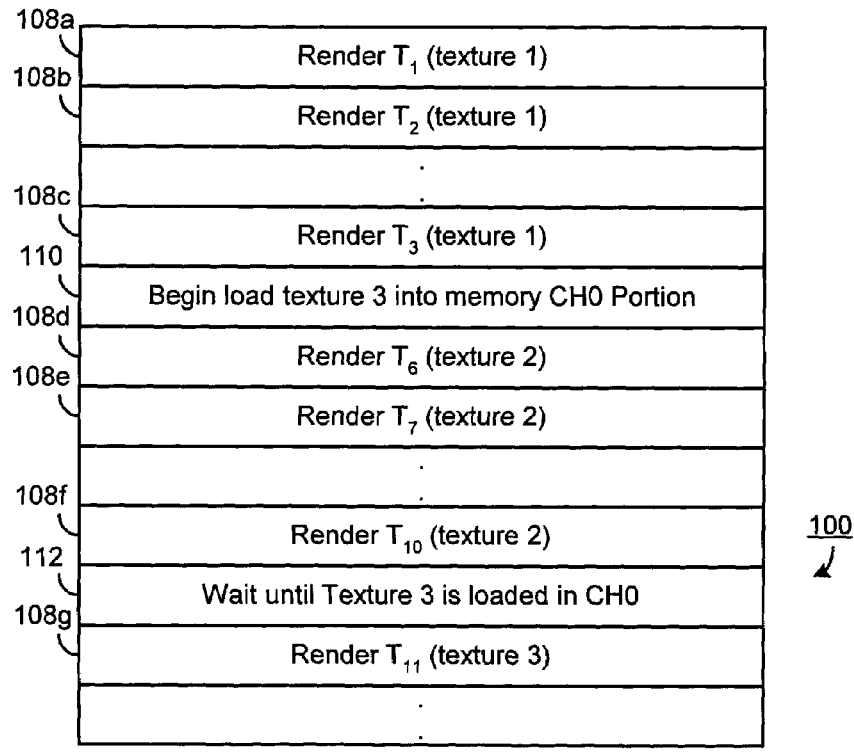
FIG. 7 illustrates a table representing a plurality of rendering commands, in accordance with one embodiment of the present invention.

FIG. 7 illustrates a graphical representation of the command queue 106 having a plurality of exemplary rendering commands 108A–108G, an exemplary generate_event command 110 and an exemplary wait_until command 112 therein. In one exemplary embodiment, a render command 108A may be provided to render rendering portion T_1, such as vertices, pixel or surface location, to be rendered using a first texture data. Using the system of FIG. 6, texture one information may be loaded in the first cache 242 within the three-dimensional texture engine prior to the execution of rendering command 108A. The synchronized queued DMA 232 may then receive the next rendering command 108B from the command queue 106 which may be disposed within the third memory portion 226. A second rendering portion, T_2, is also rendered using the first texture data. Another rendering command 108C rendering a third portion, T_3, using a first texture data.

Disposed within the command queue, a generate_event command 110 may be retrieved by the synchronized queued DMA device 232 to begin loading a third texture into three-dimensional texture engine memory channel zero 242, overwriting the first texture information disposed therein since the rendering elements requiring the texture information have been rendered. Thereupon, further rendering commands 108D, 108E and 108F are executed rendering other rendering elements using second texture information disposed within, in one embodiment, a second memory portion 244 within the three-dimensional texture engine 240.

At this point, disposed within the command queue 106 is a wait_until command 112 requiring that the command processor 194 wait until all of texture three information is loaded into the first memory channel 242. Across the bus 234, the event command 236 is provided and the processing is stalled until the done command 238 is provided back to the command processor such that the synchronized queued DMA 232 may further then provide the next rendering command 108G to the command processor 194 and the three-dimensional texture engine may render the rendering element T_11. As recognized by one having ordinary skill in the art, commands are continually retrieved from the command queue 106 such that the command processor 194, in conjunction with the three-dimensional texture engine 240, may effectively render a graphics display.

Figure 8:
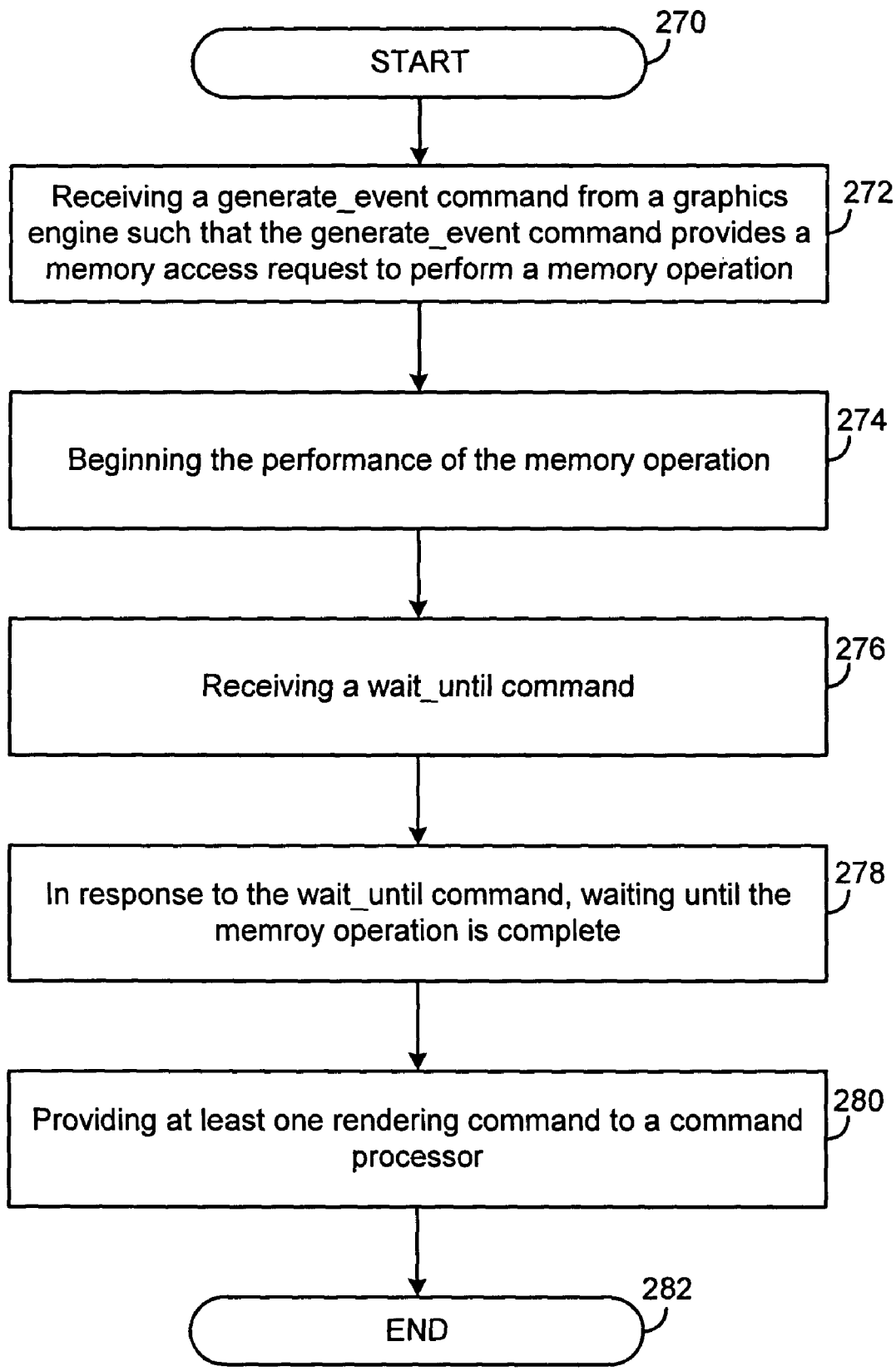
FIG. 8 illustrates a flowchart of a method for graphics rendering in a mobile device in accordance with one embodiment of the present invention.

FIG. 8 illustrates a flowchart representing the steps of one embodiment of the method for graphics rendering in a mobile device. The method begins, step 270, by receiving a generate_event command that provides a memory access request to perform a memory operation, step 272. As discussed above, the generate_event command may be a command to load texture information into a specific memory portion, wherein a direct memory access device retrieves the texture information from an external memory device, such as an SD card. The next step of the method, step 274, is beginning the performance of the memory operation. Thereupon, a wait_until command is received, step 276. Similar to the embodiment discussed above, an exemplary wait_until command 112 may be to wait until all of the texture information is loaded into a specific memory portion.

Thereupon, the method includes, in response to the wait_until command, waiting until the memory operation is complete, step 278. Once the memory operation is complete, step 280 includes providing at least one rendering command to a command processor. Such as in the embodiment illustrated above in FIG. 6, the command processor 194 may execute a rendering command using the texture information, such as texture information loaded within the three-dimensional texture engine memory portion 242, thereupon, the method is complete, step 282.

Figure 9:
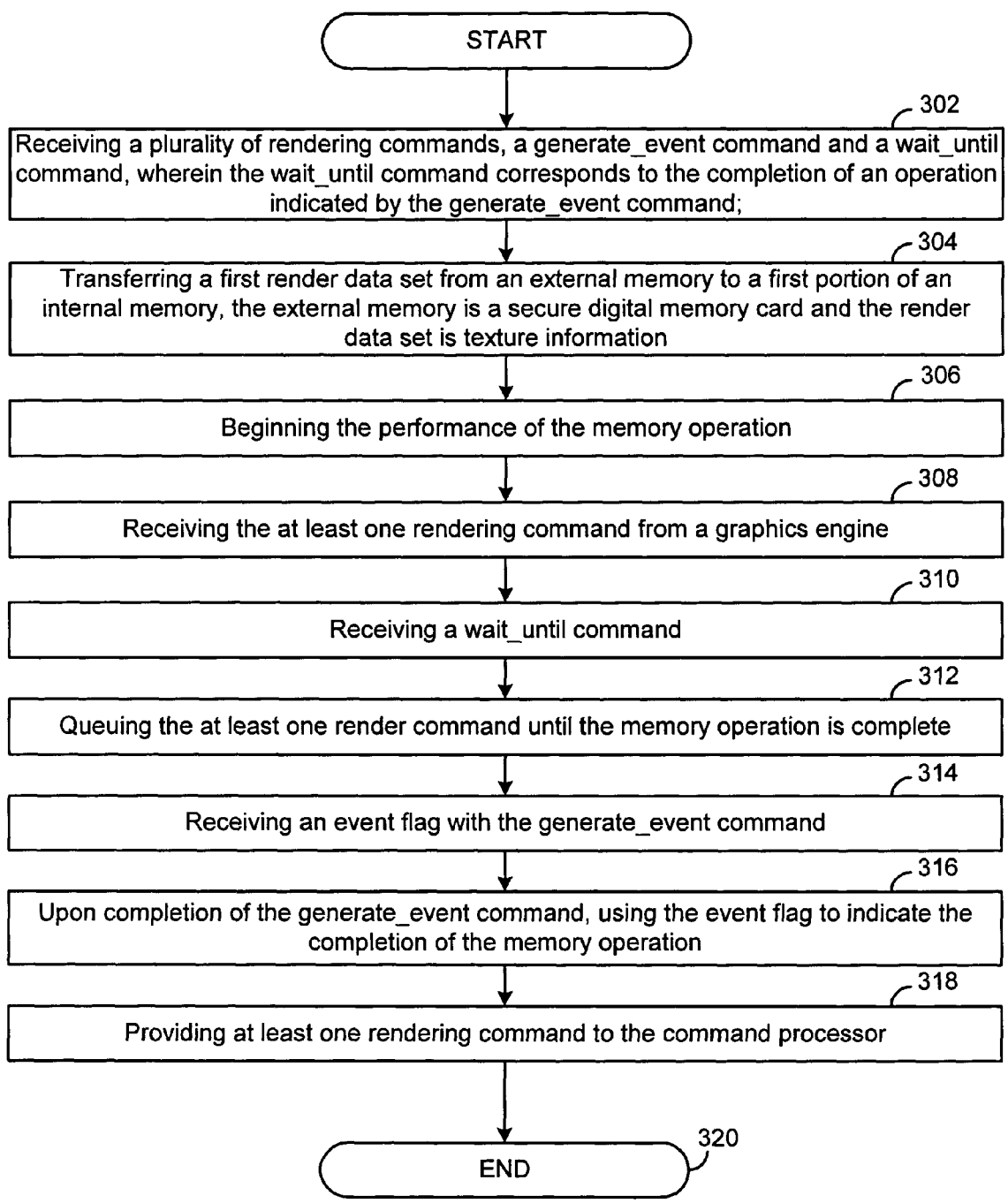
FIG. 9 illustrates another flowchart of another embodiment of the method for graphics rendering.

FIG. 9 illustrates another embodiment of the method for graphics rendering in a mobile device. The method begins, step 300, by receiving a plurality of rendering commands, a generate_event command and a wait_until command in a command queue, wherein the wait_until command corresponds to the completion of an operation indicated by the generate_event command, step 302. The next step, step 304, is transferring a first rendered data set from an external memory to a first portion of an internal memory, wherein the external memory is a secured digital memory card and the render data set is texture information.

Thereupon, the method includes beginning the performance of the memory operation, step 306. Performance of the memory operation may include loading the render data set, texture information, to an internal memory location. The next step, step 308, is receiving the at least one rendering command from a graphics engine. In one embodiment, the graphics engine may be the three-dimensional engine 240 of FIG. 6. Based on commands within the command queue, the next step, step 310 may be to receive a wait_until command. Thereupon, the method includes queuing at least one render command until the memory operation is complete, step 312.

When the memory operation is complete, an event flag is received with the generate_event command, step 314. Upon completion of the generate_event command, the method includes using the event flag to indicate the completion of the memory operation, step 316. In one embodiment, the event flag may be provided to the processor, such as processor 194 such that the flag may be provided back to the synchronized queued DMA 232 to signal completion of the memory operation. The next step of the method includes providing at least one rendering command to the command processor, step 318. Thereupon, the method is complete, step 320.

The present invention improves over prior art graphics processing techniques within mobile devices through the utilization of the multi-media processor 164 and specific interactions with an external memory device 186 having rendering data sets stored thereon. By using the multi-media processor 164 separate and distinct from the CPU 156, valuable CPU processing cycles are not utilized for graphics rendering and limited memory space is not utilized to store texture information. Furthermore, the multi-media processor 164 does not utilize the limited bandwidth provided between the CPU 156 and the display device 136, but rather utilized low bandwidth transmission paths to provide for the disposition of rendering data sets within embedded memory locations for improved graphics rendering techniques.

It should be understood that the implementation of other variations and modifications of the invention in its various aspects will be apparent to those of ordinary skill in the art, and that the invention is not limited by the specific embodiments described herein. For example, the texture information loaded from an external memory device, such as the SD memory 186, may be provided to another external memory device or another portion of the SD memory device 186 in the event a large rendering data set is provided or there is an even smaller amount of limited available memory space within the graphics rendering engine. It is therefore contemplated and covered by the present invention, any and all modifications, variations, or equivalents that fall within the spirit and scope of the basic underlying principles disclosed and claimed herein.

What is claimed is:

1. An apparatus for graphics rendering in a mobile device comprising:
   a command queue capable of receiving a plurality of rendering commands, a generate_event command and a wait_until command, wherein the wait_until command corresponds to the completion of an operation indicated by the generate_event command;
   a direct memory access device coupled to the command queue, the direct memory access device capable of receiving a memory access command in response to the generate_event command;
   a memory device storing rendering information, the memory device accessible in response to the generate_event command; and
   the command queue capable of queuing the rendering commands in response to the wait_until command until the completion of the operation indicated by the generate_event command.

2. The apparatus of claim 1 wherein the memory device is an external memory device, the apparatus further comprising:
   the external memory device storing a plurality of rendering data sets; and
   an embedded memory device capable of storing one of the plurality of rendering data sets.

3. The apparatus of claim 2 wherein the memory access command includes loading one of the plurality of rendering data sets from the external memory to the embedded memory.

4. The apparatus of claim 3 wherein the embedded memory includes a plurality of memory portions and the plurality of rendering data set is loaded to one of the plurality of memory portions.

5. The apparatus of claim 3 wherein the external memory is a secure digital memory card.

6. The apparatus of claim 1 further comprising:
   a graphics rendering engine operably coupled to the command queue such that the graphics rendering engine generates the rendering commands, the generate_event command and the wait_until command.

7. The apparatus of claim 6 further comprising:
   a command processor, coupled to the command queue and the direct memory access device such that the processor executes the rendering commands.

8. The apparatus of claim 7 wherein the rendering commands include accessing the rendering information in the memory device.

9. The apparatus of claim 1 wherein the generate_event command includes a pointer such that upon completion of the event, the pointer is provided to the command queue.

10. A method for graphics rendering in a mobile device comprising:
    receiving a generate_event command from a graphics engine such that the generate_event command provides a memory access request to perform a memory operation;
    beginning the performance of the memory operation;
    receiving a wait_until command;
    in response to the wait_until command, waiting until the memory operation is complete; and
    providing at least one rendering command to a command processor.

11. The method of claim 10 further comprising:
    receiving the at least one rendering command; and
    queuing the at least one render command until the memory operation is complete.

12. The method of claim 11 further comprising:
    receiving an event flag with the generate_event command; and
    upon completion of the generate_event command, using the event flag to indicate the completion of the memory operation.

13. The method of claim 10 wherein the generate_event command includes transferring a first render data set from an external memory to a first portion of an internal memory.

14. The method of claim 13 wherein the external memory is a secure digital memory card and the render data set is texture information.

15. The method of claim 10 wherein the at least one render command is received from a graphics engine.

16. A graphics rendering chip in a mobile device comprising:
    a command queue capable of receiving a plurality of rendering commands, a generate_event command and a wait_until command, wherein the wait_until command corresponds to the completion of an operation indicated by the generate_event command;
    a direct memory access device coupled to the command queue, the direct memory access device capable of receiving a memory access command in response to the generate_event command;
    an embedded memory device capable storing rendering information; and
    an external memory interface coupleable to an external memory device such that rendering information may be provided, in response to the generate_event command, to the embedded memory
    the command queue capable of queuing the rendering commands in response to the wait_until command until the completion of the operation indicated by the generate_event command.

17. The graphics rendering chip of claim 16 further comprising:
    a graphics rendering engine operably coupled to the direct memory access; and
    a command processor coupled to the command queue such that the rendering commands may be provided to the command processor when the operation indicated by the generate_event command is completed.

18. The graphics rendering chip of claim 16 wherein the external memory device is a secure digital memory card.

19. The graphics rendering chip of claim 16 operable coupleable to a central processor via a flex cable.

20. The graphics rendering chip of claim 16 capable of being mounted on the flex cable within the mobile device.

21. The graphics rendering chip of claim 16 operable coupleable to at least one display such that command processor upon generating a video display output, the video display output may be provided to the at least one display.

22. The graphics rendering chip of claim 16 operably coupleable to a camera such that a capture video image may be received and processed by the command processor.

23. The graphics rendering chip of claim 16 wherein:
the rendering information is at least one of:
texture data vertex data and scene description data.

24. A mobile device comprising:
a baseband receiver operably coupled to a wireless antenna;
a central processing unit operably coupled to a processing unit memory module;
a video display controller operably coupled to the central processing unit;
a video display unit coupled to the video display controller such that a video display output may be provided to the video display unit by the video display controller;
a graphics rendering chip coupled to the central processing unit, wherein the graphics rendering chip includes an embedded memory device, a direct memory access device and an external memory interface; and
an external memory device operably coupleable to the graphics rendering chip across the external memory interface, wherein the external memory device stores at least one of a plurality of rendering data sets that may be provided to the embedded memory for the processing of the video display output by the graphics rendering chip such that the video display output may be provided to the video display controller.

25. The mobile device of claim 24, wherein the video display controller is coupled to the central processing unit via a flex cable and the graphics rendering chip is mounted on the flex cable.

26. The mobile device of claim 24 wherein the external memory device is a secure digital card.

27. The mobile device of claim 24 wherein the graphics rendering chip further includes:
a command queue capable of receiving a plurality of rendering commands, a generate_event command and a wait_until command, wherein the wait_until command corresponds to the completion of an operation indicated by the generate_event command;
a direct memory access device coupled to the command queue, the direct memory access device capable of receiving a memory access command in response to the generate_event command such that rendering information may be provided, in response to the generate_event command, to the embedded memory; and
the command queue capable of queuing the rendering commands in response to the wait_until command until the completion of the operation indicated by the generate_event command.

28. The mobile device of claim 27 further comprising:
a graphics rendering engine operably coupled to the direct memory access device; and
a command processor coupled to the command queue such that the rendering commands may be provided to the command processor when the operation indicated by the generate_event command is completed.

29. The mobile device of claim 24 operably coupleable to a camera such that a capture video image may be received and processed by the command processor.

* * * * *